United States Patent
Bajko

(10) Patent No.: US 9,451,472 B2
(45) Date of Patent: Sep. 20, 2016

(54) METHOD AND APPARATUS FOR PROVIDING A WIFI NETWORK INFORMATION SERVICE

(71) Applicant: Nokia Technologies Oy, Espoo (FI)

(72) Inventor: Gabor Bajko, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/657,144

(22) Filed: Mar. 13, 2015

(65) Prior Publication Data
US 2015/0358830 A1    Dec. 10, 2015

Related U.S. Application Data

(63) Continuation of application No. 13/401,289, filed on Feb. 21, 2012, now Pat. No. 9,008,709.

(51) Int. Cl.
| | |
|---|---|
| *H04B 7/00* | (2006.01) |
| *H04W 16/18* | (2009.01) |
| *H04W 4/02* | (2009.01) |
| *H04L 12/24* | (2006.01) |
| *H04W 48/14* | (2009.01) |
| *H04W 88/08* | (2009.01) |
| *H04W 84/12* | (2009.01) |

(52) U.S. Cl.
CPC .......... *H04W 16/18* (2013.01); *H04L 41/0803* (2013.01); *H04W 4/028* (2013.01); *H04W 48/14* (2013.01); *H04W 4/02* (2013.01); *H04W 84/12* (2013.01); *H04W 88/08* (2013.01)

(58) Field of Classification Search
CPC ...................................................... H04W 84/02
USPC ................ 455/507, 456.1, 411, 67.11, 414.2
See application file for complete search history.

(56) References Cited

U.S. PATENT DOCUMENTS

| | | | | |
|---|---|---|---|---|
| 2009/0278705 | A1* | 11/2009 | Chhabra ............... | H04W 48/20 340/8.1 |
| 2010/0142442 | A1* | 6/2010 | Pandey .................. | H04W 4/22 370/328 |
| 2011/0286437 | A1* | 11/2011 | Austin .................... | H04W 4/02 370/338 |

* cited by examiner

*Primary Examiner* — Sanh Phu
(74) *Attorney, Agent, or Firm* — Ditthavong & Steiner, P.C.

(57) ABSTRACT

An approach is provided for providing a WiFi network information service. A configuration client processes and/or facilitates a processing, by at least one module of at least one access point, of configuration data stored at the at least one access point to determine network information. The configuration client then causes a transmission of the network information by the at least one module to at least one server. A location client also determines at least one request, from at least one client, for network information associated with at least one access point, at least one location, or a combination thereof. The location client then processes and/or facilitates a processing of the at least one request to cause a generation of at least one query for the network information from at least one server, wherein the network information is determined from at least one module of the at least one access point.

20 Claims, 10 Drawing Sheets

METHOD AND APPARATUS FOR PROVIDING A WIFI NETWORK INFORMATION SERVICE

CROSS-REFERENCE TO RELATED APPLICATION

This application is a continuation of U.S. patent application Ser. No. 13/401,289, filed Feb. 21, 2012, entitled "Method and Apparatus for Providing a Wifi Network Information Service", which is incorporated herein by reference in its entirety.

BACKGROUND

Service providers and device manufacturers (e.g., wireless, cellular, etc.) are continually challenged to deliver value and convenience to consumers by, for example, providing compelling network services. One area of interest has been the development of information databases related to the characteristics and locations of wireless fidelity (WiFi) networks. More specifically, as the sophistication and functionality of mobile applications (e.g., mapping and/or navigation applications) for mobile devices (e.g., mobile phones and tablets) increases, it is also becoming increasingly important for those mobile devices to discover network attachment points (e.g., access points (APs)) in target networks in a timely, accurate, and effective manner. In this regard, various companies (e.g., Google and Nokia) have developed methods for obtaining information related to the characteristics and locations of APs (e.g., employing specialized cars having WiFi detection equipment). However, this collection process is laborious, costly, and often results in inaccurate location information. In addition, under current standardized protocols (e.g., Institute of Electrical and Electronics Engineers (IEEE) 802.11) stations (STA) within a particular WiFi network tend to query all APs within that network about a lot of information (e.g., network authentication types supported, venue name, roaming agreements in place, etc.) causing considerable congestion and delay (e.g., generic advertisement service (GAS) responses with a one to two second delay). Accordingly, service providers and device manufacturers face significant technical challenges in providing a service that enables efficient and cost effective collection and distribution of WiFi network information.

SOME EXAMPLE EMBODIMENTS

Therefore, there is a need for an approach for providing a WiFi network information service.

According to one embodiment, a method comprises processing and/or facilitating a processing, by at least one module of at least one access point, of configuration data stored at the at least one access point to determine network information. The method also comprises causing, at least in part, a transmission of the network information by the at least one module to at least one server.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing, by at least one module of at least one access point, of configuration data stored at the at least one access point to determine network information. The apparatus is also caused to cause, at least in part, a transmission of the network information by the at least one module to at least one server.

According to another embodiment, a computer-readable storage medium carries one or more sequences of one or more instructions which, when executed by one or more processors, cause, at least in part, an apparatus to process and/or facilitate a processing, by at least one module of at least one access point, of configuration data stored at the at least one access point to determine network information. The apparatus is also caused to cause, at least in part, a transmission of the network information by the at least one module to at least one server.

According to another embodiment, an apparatus comprises means for processing and/or facilitating a processing, by at least one module of at least one access point, of configuration data stored at the at least one access point to determine network information. The apparatus also comprises means for causing, at least in part, a transmission of the network information by the at least one module to at least one server.

According to one embodiment, a method comprises determining at least one request, from at least one client, for network information associated with at least one access point, at least one location, or a combination thereof. The method also comprises processing and/or facilitating a processing of the at least one request to cause, at least in part, a generation of at least one query for the network information from at least one server, wherein the network information is determined from at least one module of the at least one access point.

According to another embodiment, an apparatus comprises at least one processor, and at least one memory including computer program code for one or more computer programs, the at least one memory and the computer program code configured to, with the at least one processor, cause, at least in part, the apparatus to determine at least one request, from at least one client, for network information associated with at least one access point, at least one location, or a combination thereof. The apparatus is also caused to process and/or facilitate a processing of the at least one request to cause, at least in part, a generation of at least one query for the network information from at least one server, wherein the network information is determined from at least one module of the at least one access point.

According to another embodiment, a computer-readable storage medium carries one or more sequences of one or more instructions which, when executed by one or more processors, cause, at least in part, an apparatus to determine at least one request, from at least one client, for network information associated with at least one access point, at least one location, or a combination thereof. The apparatus is also caused to process and/or facilitate a processing of the at least one request to cause, at least in part, a generation of at least one query for the network information from at least one server, wherein the network information is determined from at least one module of the at least one access point.

According to another embodiment, an apparatus comprises means for determining at least one request, from at least one client, for network information associated with at least one access point, at least one location, or a combination thereof. The apparatus also comprises means for processing and/or facilitating a processing of the at least one request to cause, at least in part, a generation of at least one query for the network information from at least one server, wherein the network information is determined from at least one module of the at least one access point.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a WiFi network information service are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
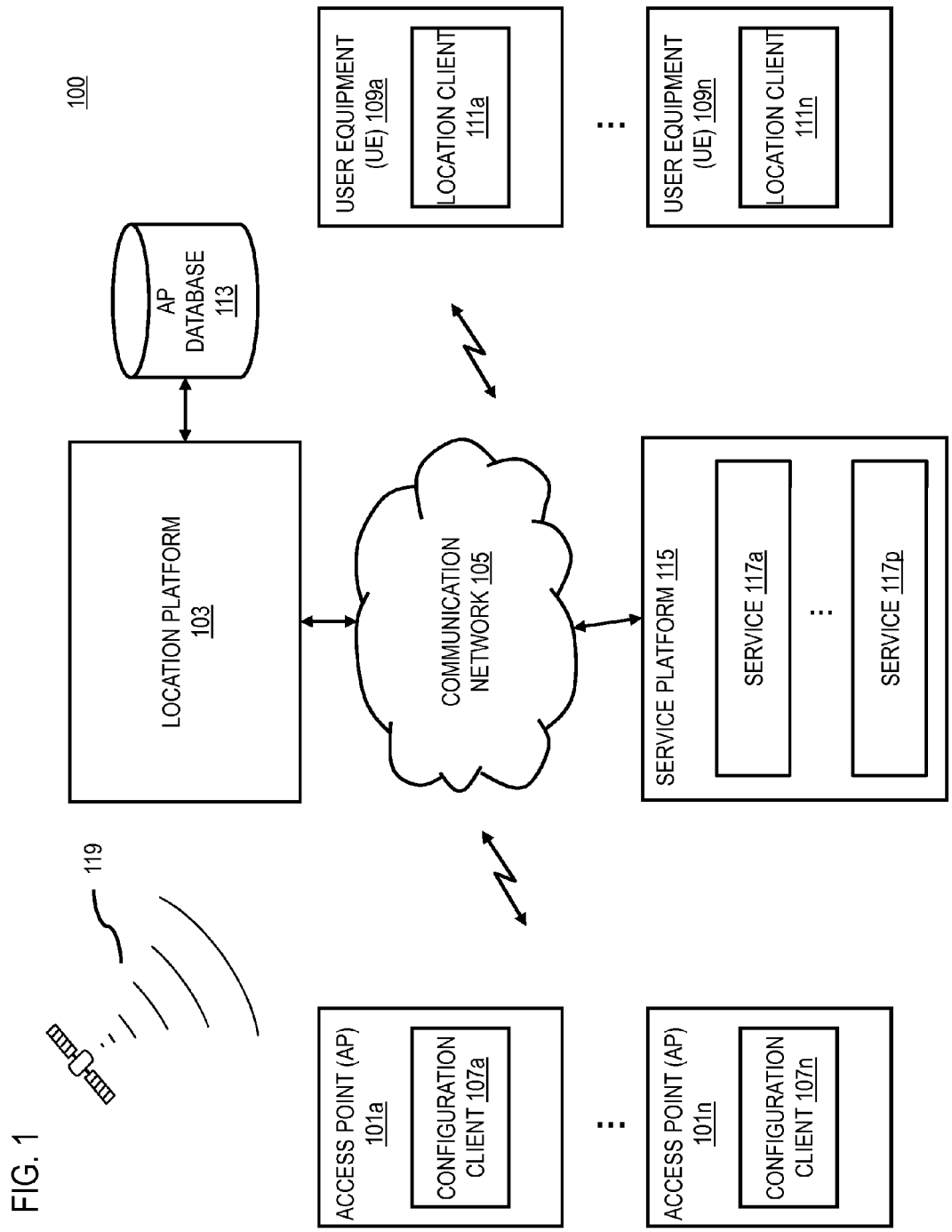
FIG. 1 is a diagram of a system capable of providing a WiFi network information service, according to one embodiment.

FIG. 1 is a diagram of a system capable of providing a WiFi network information service, according to one embodiment. As previously discussed, as the sophistication and functionality of mobile applications (e.g., mapping and/or navigation applications) for mobile devices (e.g., mobile phones and tablets) increases, it is also becoming increasingly important for those mobile devices to discover network attachment points (e.g., access points (APs)) in target networks in a timely, accurate, and effective manner. In this regard, various companies (e.g., Google and Nokia) have developed methods for obtaining information related to the characteristics and locations of APs (e.g., employing specialized cars having WiFi detection equipment). However, this collection process is laborious, costly, and often results in inaccurate location information. By way of example, when WiFi signals are collected with these specialized cars, the WiFi network is associated with the global position system (GPS) coordinates of the place where the AP was detected even though the AP might be as far as 50 to 100 meters from that location. When a mobile device (e.g., a mobile phone) detects a particular AP, it might also be 50 to 100 meters from the AP, and in the worst case scenario, the mobile device may be on the opposite side of the AP (i.e., 100 to 200 meters from the place where the car detected the AP). As a result, the mobile device would be positioned with the GPS coordinates at a point 200 meters away from the AP. In addition, various governmental agencies and/or entities (e.g., the European Union) have recently implemented legislation to restrict the types of information that may be collected from APs (e.g., beacon frames and some other management frames). As a result, much of the vital network information associated with an AP, even if its public information, cannot be collected with the current methods. Further, under current standardized protocols (e.g., IEEE 802.11u amendment) STAs tend to query all APs within that network in pre-associated state, to learn their configuration information, which causes considerable congestion and delay.

To address this problem, a system 100 of FIG. 1 introduces the capability to providing a WiFi network information service. More specifically, the system 100, from the AP side perspective, processes or collects configuration data (i.e., parameters) stored within an AP (e.g., stored in Management Information Base (MIB) variables within the AP) to determine network information related to the AP. In particular, the system 100 employs a simple code in the AP, which would be vendor specific unless the operating system of the AP is open source, to collect the parameters from the MIB variables. If the operating system is open source then an additional code to the firmware such as DD-WRT or openwrt may be used by the system 100 to collect the information from the MIB variables. In particular, the configuration data stored in the MIB variables may include information which the AP is configured with such as the link layer security mechanism, authentication mechanism, Media Access Control (MAC) address, Service Set Identifier (SSID), the list of realms the AP supports, fully qualified domain name (FQDN), Geo-location information, Civic-location information, wide area network (WAN) metric information, internet protocol (IP) address, service information (e.g., whether the AP belongs to a store), the AP vendor name, firmware version, etc. In addition, the configuration information may also include measurement information from neighbor reports, which contain most of the same information about neighboring APs that could be candidates for a service set transition.

In one embodiment, once the system 100 processes the configuration data, the system 100 formats the network information so that the information may then be transmitted to a server, wherein the network information is made available by the server to one or more clients (e.g., a STA), one or more candidate clients (e.g., a STA proximate to the at least one AP), or a combination thereof associated with the AP. In certain embodiments, the AP may transmit the network information to more than one server. More specifically, the system 100 formats the network information (e.g., the configuration data and measurement information) according to one or more data formats common to the AP, the server, the one or more clients, the one or more candidate clients, or a combination thereof (e.g., placing the collected parameters into a pre-defined Extensible Markup Language (XML) document).

In one embodiment, after the system 100 formats the network information, the system 100 determines the address information associated with the server from either preconfigured information stored at the AP (e.g., the way that Dyn, Inc. Domain Name Service (DynDNS) implementations currently work on most APs), one or more server discovery protocols (e.g., a DNS or Location-to-Service Translation (LoST) based protocol), or a combination thereof. Based on the determined address information, the system 100 transmits the network information to the server using a standardized protocol (e.g., IEEE 802.21 defined Media Independent Handover (MIH) or Hypertext Transfer Protocol (HTTP). In one embodiment, once the server receives all of this information, the system 100 makes the information available to one or more clients, one or more candidate clients, or a combination thereof in order to facilitate positioning and/or network selection of the clients.

In one embodiment, the initiation of the processing of the configuration data, the transmission of the network information, or a combination thereof by the system 100 is based on an initialization of the AP, a predetermined schedule, an update to the configuration data, an expiration of the network information, or a combination thereof.

In one embodiment, from the client perspective, the system 100 determines at least one request from a client (e.g., a STA) for networking information associated with the AP. In particular, a client may request the networking information for positioning and/or network selection purposes (e.g., learn the IP address version supported by the AP, or learn the roaming partners supported by the AP, etc.) to avoid congesting the network by placing a GAS query to each AP, to increase handover efficiency, etc. In one embodiment, the system 100 first determines capability information (e.g., the realm its credentials belong to) and contextual information (e.g., security information, the client's approximate location, AP identifiers, etc.), predicted contextual location (e.g., a range of geo-coordinates where the station is likely to move, the amount of bandwidth an application may likely require, etc.), at least one parameter which identifies at least one AP, or a combination thereof associated with the client. More specifically, the current location of the client may be determined from the GPS information associated with the client, cell ID, assisted GPS (A-GPS), or a combination thereof. Optionally, the system 100 can also cause a pre-configuration of the network information at the client based on the contextual information, the predicted contextual information, the at least one parameter which identifies at least one AP, or a combination thereof. By way of example, the pre-configuration of the network information can enable the system 100 to discover neighboring APs ahead of time and thus expedite the handover time during the movement of the client towards or away from an associated AP.

In one embodiment, the system 100 next processes the client request to cause a generation of a query for network information from the server, wherein the network information is determined from the associated AP. In particular, the query further includes the contextual information, the predicted contextual information, the at least one parameter which identifies at least one AP, or a combination thereof associated with the client. By way of example, once the server of the system 100 has updated information about the APs and their characteristics and modes of operation in a certain location, the client could access the server using a protocol like HTTP Enabled Location Delivery (HTTP HELD) in order to obtain network information regarding nearby APs. More specifically, the query for network information substitutes for, supplements, or a combination thereof local discovery of the network information from the proximate APs by the client. In response, the server of the system 100 delivers the requested information to the client in an HTTP response including the requested data in an XML formatted form (e.g., a pre-defined XML document). As previously discussed, the client could then use the received network information for positioning and/or network selection purposes.

The system 100 provides a number of benefits by enabling the client to obtain network information from a server rather than directly from the APs. In particular, since the data the client requires for network selection is already uploaded to the server, the system 100 obviates the delay in asking each AP separately about its network information (e.g., the realms it supports or its roaming partners). Data reported by the system 100 to the server would be more accurate and more up-to-date compared to other currently used collection methods. Further, the client in the system 100 would be able to pre-select a network from the data received from the server. As a result, the client could build a list of potential networks to connect to when the signal-to-noise-ration (SNR) of the currently associated AP drops, further increasing handover efficiency. In addition, as previously discussed, the system 100 reduces congestion on the WiFi radio interface by not making a GAS query to every proximate AP every time.

As shown in FIG. 1, the system 100 comprises one or more access points (APs) 101a-101m also collectively referred to as APs 101) having connectivity to a location platform 103 (e.g., a location server) via a communication network 105. The APs 101 communicate with the location platform 103 through a configuration client 107a-107m (e.g., an HTTP client) (also collectively referred to as configuration clients 107. The location platform 103 is also connected to one or more user equipment (UE) 109a-109n (e.g., a STA) (also collectively referred to as UEs 109) via the communication network 105. The UEs 109 communicate with the location platform 103 through a location client 111a-111n (e.g., a WiFi client) (also collectively referred to as location clients 111). The location platform 103 is also connected to an AP database 113. In one embodiment, the AP database 113 may contain network information (e.g., the information the APs 101 in the neighborhood of UEs 109 reported about themselves and their neighbors), the location of the reporting AP 101 or one of its neighbors as previously determined (e.g., by a street car), or a combination thereof. The AP database 113 may exist in whole or in part within the location platform 103, or independently. The APs 101, the location platform 103, and the UEs 109 are also connected to a service platform 115, which includes one or more services 117a-117p (e.g., networking products services, mapping and location-based services, etc.) (also collectively referred to as services 117). By way of example, the services 117 (e.g., a networking products service) may periodically issue updates regarding configuration data of the APs 101.

In certain embodiments, a UE 109 may utilize location-based technologies (GPS, cellular triangulation, A-GPS, etc.) to provide the location platform 103 information about its approximate location and request information the APs 101 in the neighborhood of the UE 109s reported about themselves and their neighbors. For example, a UE 109 may include a GPS receiver to obtain geographic coordinates from satellites 119 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 109 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof that has the capability to use 802.11 protocol, including the accessories and peripherals of these devices, or any combination thereof. It is also contemplated that the UE 109 can support any type of interface to the user (such as "wearable" circuitry, etc.).

In one embodiment, from the AP 101 side perspective, the configuration client 107 processes or collects configuration data stored within an AP 101 (e.g., stored in MIB variables within the AP 101) to determine network information related to the AP 101. More specifically, the configuration client 107 would include a simple code, which would be vendor specific unless the operating system in the AP 101 is open source, to collect the parameters. As previously discussed, the configuration information stored within the AP 101 may also include measurement information from neighbor reports.

In one embodiment, once the configuration client 107 processes the configure data, the configuration client 107 formats the network information so that the information may be transmitted to the location platform 103 (e.g., a location server), wherein the network information is made available by the location platform 103 to a UE 109 (e.g., a STA) associated with the AP 101, a candidate UE 109 (e.g., proximate the AP 101), or a combination thereof. More specifically, the configuration client 107 formats the network information (e.g., the configuration data and measurement information) according to one or more data formats common the AP 101, the location platform 103, the UEs 109, or a combination thereof (e.g., placing the collected parameters into a pre-defined XML document).

In one embodiment, after the configuration client 107 formats the network information, the configuration client 107 determines the address information associated with the location platform 103 from either preconfigured information stored at the AP 101, one or more server discovery protocols (e.g., a DNS or LoST based protocol), from the 802.11 neighbor reports (which may contain the location of the neighboring APs 101) or a combination thereof. Based on the determined address information, the configuration client 107 transmits the network information to the location platform 103 using a standardized protocol such as IEEE 802.11 or HTTP. In one embodiment, once the location platform 103 receives all of this information, the location platform 103 makes the information available to the UEs 109 in order to facilitate positioning and/or network selection of the UEs 109. In another embodiment, the network information is sent to the location platform 103 by the configuration client 107 even if location of the AP 101 cannot be determined. The UE 109 would in this case query the location platform 103 using the MAC address of the AP 101 to retrieve the network information from that location platform 103.

In one embodiment, the initiation of the processing of the configuration data, the transmission of the network information, or a combination thereof by the configuration client 107 is based on an initialization of the APs 101, a predetermined schedule, an update to the configuration data, an expiration of the network information, or a combination thereof.

In one embodiment, from the UE 109 perspective, a location client 111 determines a request from a UE 109 (e.g., a STA) for networking information associated with an AP 101. In particular, a UE 109 may request the networking information from the location platform 103 for positioning purposes and/or network selection purposes (e.g., completing the "Authentication and Association Processes" with a particular AP 101), to avoid congesting the network by placing a GAS query to each AP 101, to increase handover efficiency, etc. In one embodiment, the location client 111 first determines contextual information (e.g., security information, information about the UE 109's capabilities, the UE 109's approximate location, etc.), predicted contextual location (e.g., a range of geo-coordinates where the station is likely to move, the amount of bandwidth an application may likely require, etc.), or a combination thereof associated with the UE 109. In particular, the current location of the UE 109 may be determined from the GPS information associated with the UE 109, cell ID, A-GPS, or a combination thereof. The location client 111 then causes a pre-configuration of the network information at the UE 109 based on the contextual information, the predicted contextual information, the at least one parameter which identifies at least one AP 101, or a combination thereof. By way of example, the pre-configuration of the network information can enable the UE 109 to discover neighboring APs 101 ahead of time and thus expedite handover time during the movement of the UE 109 towards or away from an associated AP 101.

In one embodiment, the location client 111 then processes the UE 109's request to cause a generation of a query for network information from the location platform 103, wherein the network information is determined from the associated AP 101. By way of example, once the location platform 103 has updated information about the APs 101 and their characteristics and mode of operation in a certain location, the UE 109 could access the location platform 103 using a protocol like HTTP HELD and request that information. More specifically, the query for network information by the UE 109 substitutes for, supplements, or a combination thereof local discovery of the network information from the APs 101. In response, the location platform 103 delivers the requested information to the UE 109 in an HTTP response including the requested data in an XML formatted form (e.g., a pre-defined XML document). As previously discussed, the UE 109 could then use the received network information for improved positioning and/or network selection. As a result, the location client 111 avoids congesting the network by placing a GAS query to each AP 101 and increases handover efficiency. In addition, the battery life of the UE 109 is also improved since the UE 109 is no longer required to do constant scanning in order to find nearby APs 101.

By way of example, the APs 101, the location platform 103, the UEs 109, and the service platform 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2A:
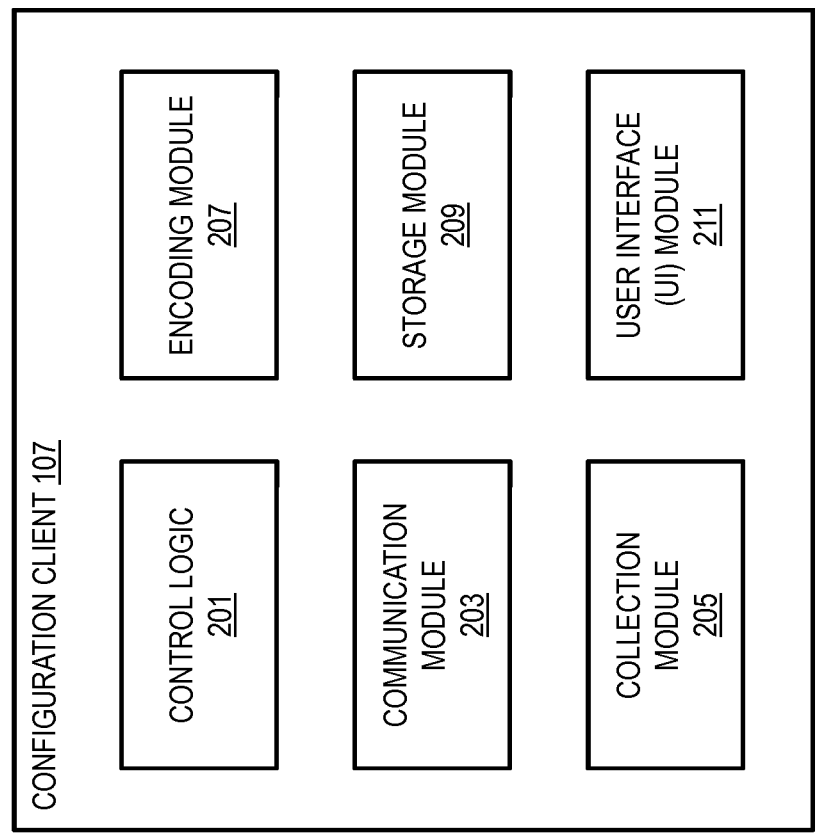
FIGS. 2A and 2B are diagrams of the components of a configuration client and a location client, respectively, according to one embodiment.

FIG. 2A is a diagram of the components of a configuration client 107, according to one embodiment. By way of example, the configuration client 107 includes one or more components for providing a WiFi network information service. It is contemplated that the functions of these components may be combined in one or more components or performed by other components of equivalent functionality. In this embodiment, the configuration client 107 includes a control logic 201, a communication module 203, a collection module 205, an encoding module 207, a storage module 209, and a user interface (UI) module 211.

The control logic 201 oversees tasks, including tasks performed by the communication module 203, the collection module 205, the encoding module 207, the storage module 209, and the user interface module 211. For example, although the other modules may perform the actual task, the control logic 201 may determine when and how those tasks are performed or otherwise direct the other modules to perform the task. In addition, the control module 201 may be used to cause an initiation of the processing of the configuration data, the transmission of the network information, or a combination thereof related to an AP 101 based on an initialization of the AP 101, a predetermined schedule (e.g., contained with the storage module 209), an update to the configuration data, an expiration of the network information, or a combination thereof.

The communication module 203 is used for communication between the configuration clients 107 of the APs 101, the location platform 103, the location clients 111 of the UEs 109, and the service platform 115. The communication module 203 may be used to communicate commands, requests, data, etc. For example, the communication module 203 may be used to discover a server (e.g., location platform 103), address information associated with the server, or a combination thereof using one or more server discovery protocols (e.g., DNS or LoST). The communication module 203 also be used in order to determine periodically updated configuration data (e.g., a firmware update) form one or more services 117 (e.g., a networking services provider). In addition, the communication module may be used to transmit the network information pertaining to an AP 101 collected by the collection module 205. More specifically, the communication module 203 is used to transmit the network information to the location platform 103 using a standardized protocol such as IEEE 802.21 defined MIH or HTTP.

The collection module 205 is used to process and/or collect configuration data stored within an AP 101 (e.g., stored in MIB variables stored within the storage module 209 of the AP 101). In particular, the collection module 205 consists of a simple code, which would be vendor specific unless the operating system of the AP (e.g., the control logic 201) is open source. If the operating system is open source than firmware such as DD-WRT or openwrt may be used in connection with the collection module 205 in order to collect the information from the MIB variables.

The encoding module 207 is used to format the network information (e.g., configuration data and measurement information) so that the communication module 203 may then transmit the information to the location platform 103. More specifically, the encoding module 207 formats the network information according to one or more data formats common to the APs 101, the location platform 103, the UEs 109, or a combination thereof (e.g., placing the collected parameters into a pre-defined XML document).

The storage module 209 is used to store the MIB variables containing the configuration information for an AP 101 as well the neighbor reports, which contain most of the same information about neighboring APs 101 (e.g., APs 101 that are candidates for a service set transition). More specifically, the MIB variables contained with the storage module 209 may include information with which the AP 101 is configured with such as the link layer security mechanism, authentication mechanism, MAC address, SSID, the list of realms the AP supports, FQDN, Geo-location information, Civic-location information, WAN metric information, IP address, service information (e.g., whether the AP 101 belongs to a store), the AP 101 vendor name, firmware version, etc. The storage module 209 may also be used to store preconfigured server addresses (e.g., the location platform 103), schedules for causing an initiation of the processing of the configuration data, the transmission of the network information, or a combination thereof and/or overwriting stored network information.

The user interface (UI) module 211 is used in one embodiment to manually configure an AP 101 to share location data, configuration data, or a combination thereof stored within the AP 101. The user interface module 211 may also be used to enter the location of the AP 101 in a civic location form (e.g., the number, street or road name, community and county assigned to residential, commercial, institutional, and industrial buildings). In particular, civic location information is because many end users are not familiar and likely do not know the GPS coordinates of the AP 101. However, postal services in many countries have the GPS coordinates of the civic locations. Therefore, the civic location information can later be geo-coded in order to enable more precise identification of the AP 101.

Figure 2B:
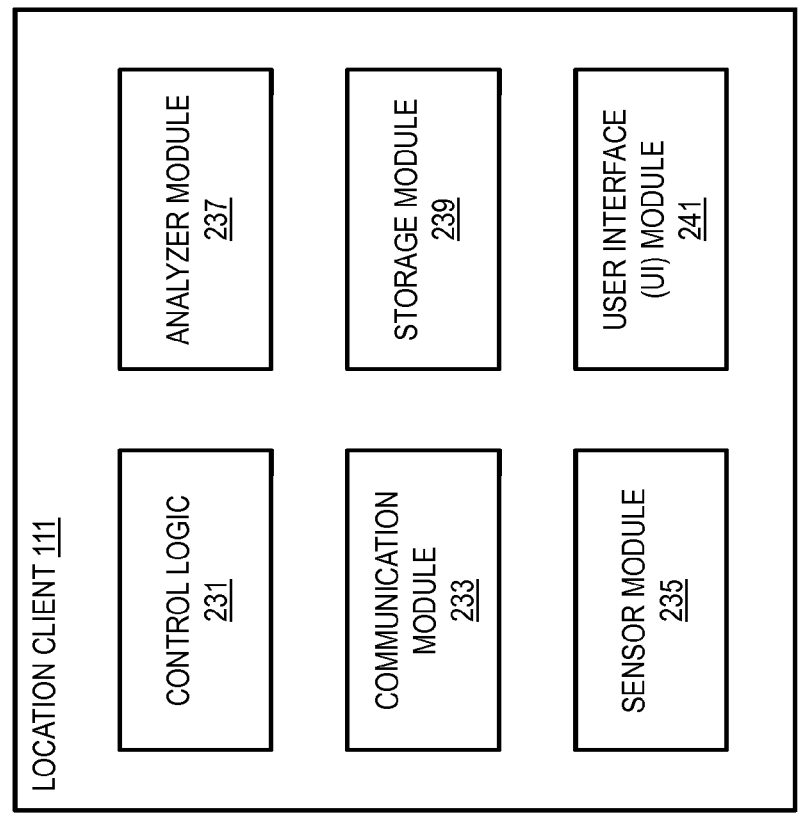

FIG. 2B is a diagram of the components of a location client 111, according to one embodiment. By way of example, the location client 111 includes one or more components for providing a WiFi network information service. It is contemplated that the functions of these components may be combined in one or more components or performed by other components of equivalent functionality. In this embodiment, the location client 111 includes a control logic 231, a communication module 233, a sensor module 235, an analyzer module 237, a storage module 239, and a user interface (UI) module 241.

The control logic 231 oversees tasks, including tasks performed by the communication module 233, the sensor module 235, the analyzer module 237, the storage module 239, and the user interface module 241. For example, although the other modules may perform the actual task, the control logic 231 may determine when and how those tasks are performed or otherwise direct the other modules to perform the task.

The communication module 233 is used for communication between the location clients 111 of the UEs 109, the location platform 103, the configuration clients 107 of the APs 101, and the service platform 115. The communication module 233 may be used to communicate commands, requests, data, etc. The communication module 233 may also be used to determine a request from a UE 109 for network information associated with an AP 101. The communication module 233, in connection with the sensor module 235 and the storage module 239, also may be used to optionally cause a pre-configuration of the network information at the UE 109 based on contextual information, predicted contextual information, at least one parameter which identifies at least one AP, or a combination thereof associated with the UE 109. By way of example, the communication module 233 can pre-discover the neighboring networks and select the best one, which improves the user experience and reduces the time needed for a handover. The communication module 233 may also be used to process the UE 109's request to cause a generation of a query for network information from the location platform 103, wherein the network information is determined from the associated AP 101. In particular, the query further includes the contextual information, the predicted contextual information, the at least one parameter which identifies at least one AP, or a combination thereof determined by the sensor module 235. By way of example, once the location platform 103 has updated information about the APs 101 and their characteristics and mode of operation in a certain location, the communication module 233 could access the location platform 103 using a protocol like HTTP HELD and request that information. The communication module 233 also may be used to determine the HTTP response from the location platform 103 including the requested data in an XML formatted form (e.g., a pre-defined XML document). The communication module 233, in connection with the analyzer module 237, may then be used to facilitate positioning and/or network selection of the UE 109.

The sensor module 235, in connection with the storage module 239, is used to determine contextual information, predicted contextual information, at least one parameter which identifies at least one AP, or a combination thereof associated with the UE 109 (e.g., security information, information about the UE 109's capabilities, the current location of the UE 109, etc.). More specifically, the sensor module 235 may be used to determine the UE 109's approximate location based on GPS coordinates, cell ID, A-GPS, or a combination thereof.

The analyzer module 237 is used to determine the network information (e.g., configuration data and measurement information) contained within the pre-defined XML document determined from the location platform 103. The analyzer module 237 may be used in connection with the communication module 233 to determine the best network proximate to the UE 109 to facilitate the positioning and/or network selection of the UE 109 as well as efficient handovers.

The storage module 239 is used to store contextual information, pre-contextual information, or a combination thereof related to the UE 109 as well as network information related to the APs 101 and the location platform 103.

The user interface module (UI) 241, in connection with the communication module 233, is used to facilitate interactions between the UE 109, the location platform 103 (e.g., a location server), and an associated AP 101. The user interface module 241 may be used to provide credentials (e.g., a username and a password) to the location platform 103 in order to establish a secure connection between the UE 109 and the location platform 103. The user interface module 241 also may be used in order to enable the GPS sensor of the UE 109 in order to increase the accuracy of the location information associated with the UE 109. The user interface module 241 may also be used in order to pre-configure the UE 109 based on contextual information, predicted contextual information, at least one parameter which identifies at least one AP, or a combination thereof associated with the UE 109. Further, the user interface module 241 may be used in order to download additional AP 101 listings to the UE 109 (e.g., based on a schedule and/or anticipated travel of an end user of the UE 109). In certain embodiments, the user interface module 241 also may be used to configure and/or modify the network information transfer protocol (e.g., HTTP HELD or some other standardized protocol) and/or the update schedule (e.g., firmware) of the UE 109.

Figure 3:
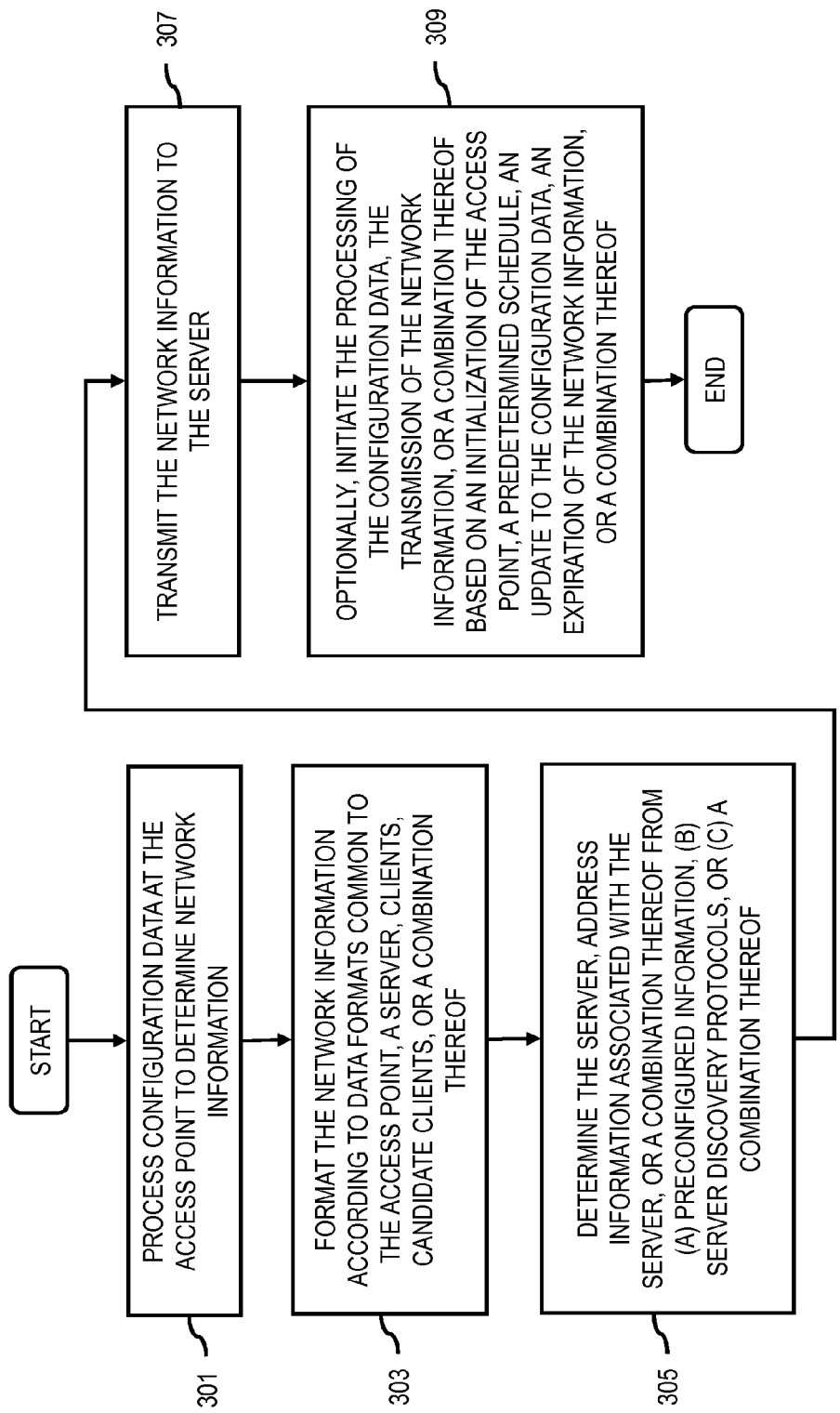
FIG. 3 is a flowchart of the access point side of a process for providing a WiFi network information service, according to one embodiment.
Figure 7:
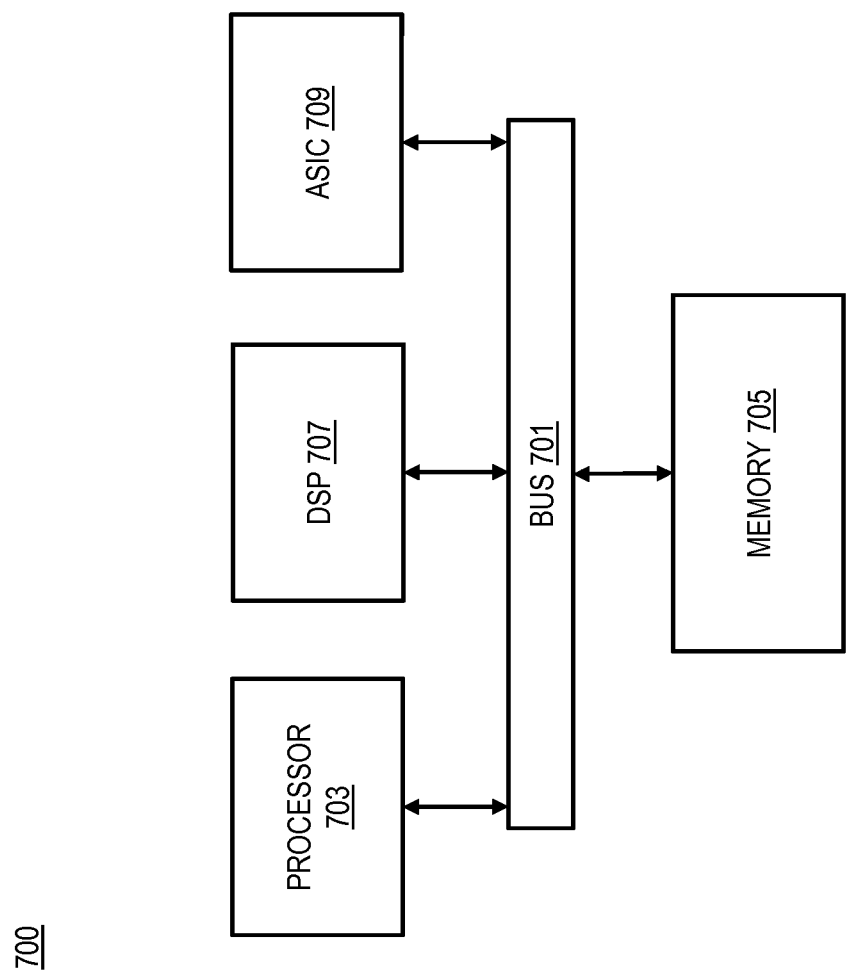
FIG. 7 is a diagram of a chip set that can be used to implement an embodiment of the invention.

FIG. 3 is a flowchart of an access point side process for providing a WiFi network information service, according to one embodiment. In one embodiment, the configuration client 107 performs the process 300 and is implemented in, for instance, a chip set including a processor and a memory as shown in FIG. 7. In step 301, the configuration client 107 processes and/or facilitates a processing, by at least one module of at least one access point, of configuration data stored at the at least one access point to determine network information. By way of example, the configuration data is stored within the MIB variables within an AP. More specifically, the configuration data for each AP may include information which the AP is configured with such as the link layer security mechanism, authentication mechanism, MAC address, SSID, the list of realms the AP supports, FQDN, Geo-location information, Civic-location information, WAN metric information, IP addresses, service information (e.g., whether the AP belongs to a store), the AP vendor name, firmware version, etc. In addition, the configuration information may also include measurement information from neighbor reports, which contain most of the same information about neighboring APs that could be candidates for a service set transition.

In step 303, the configuration client 107 causes, at least in part, a formatting of the network information according to one or more data formats common to the at least one access point, the at least one server, the one or more clients, the one or more candidate clients, or a combination thereof. By way of example, the network information (e.g., the configuration data and measurement information) and/or AP parameters collected from the MIB variables are placed by the configuration client 107 into a pre-defined XML document that is common to the APs, the server, the clients, the candidate clients, or a combination thereof. Further, candidate clients are potential clients (e.g., STAs associated with a neighbor APs) that may be evaluating network availability and/or considering associating with the AP in question.

In step 305, the configuration client 107 determines the at least one server, address information associated with the at least one server, or a combination thereof from (a) preconfigured information stored at the at least one access point, (b) one or more server discovery protocols, or (c) a combination thereof. By way of example, a server address may be preconfigured in the AP (e.g., the way DynDNS implementations currently work on most APs), or a discovery protocol may be implemented by the AP (e.g., a DNS or LoST based protocol), which would allow the AP to discover the IP address of the server, and then contact the server.

In step 307, the configuration client 107 causes, at least in part, a transmission of the network information by the at least one module to at least one server, wherein the network information is made available by the at least one server to one or more clients, one or more candidate clients, or a combination thereof of the at least one access point. By way of example, the configuration client 107 transmits the network information to the server (e.g., the location platform 103) using a standardized protocol such as IEEE 802.11 or HTTP. Once at the server, the network information, the configuration data, or a combination thereof facilitate, at least in part, one or more positioning functions, one or more network selection functions, or a combination thereof relative to one or more clients.

In step 309, the configuration client 107 optionally causes, at least in part, an initiation of the processing of the configuration data, the transmission of the network information, or a combination thereof based, at least in part, on an initialization of the at least one access point, a predetermined schedule, an update to the configuration data, an expiration of the network information, or a combination thereof. By way of example, processing of the configuration data, the transmission of the network information to the server, or a combination thereof by the configuration client 107 could be triggered by the first installation of the AP or a general booting up of the AP. The process could also be triggered by one or more updates of one or more neighbor reports (e.g. based on movement of the neighboring APs). In one embodiment, the frequency of the updates would initially be set at a default value, which could then be manually modified by an end user on an as-needed basis.

Figure 4:
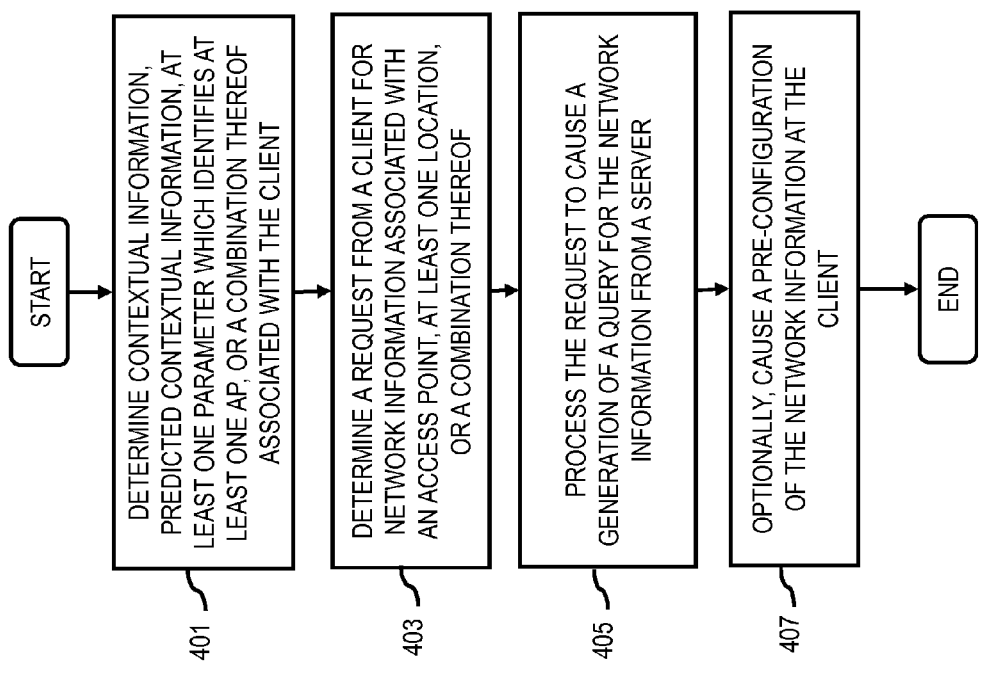
FIG. 4 is a flowchart of the client side of a process for providing a WiFi network information service, according to one embodiment.

FIG. 4 is a flowchart of a client side process for providing a WiFi network information service, according to one embodiment. In one embodiment, the location client 111 performs the process 400 and is implemented in, for instance, a chip set including a processor and a memory as shown in FIG. 7. In step 401, the location client 111 determines contextual information, predicted contextual information, at least one parameter which identifies at least one AP, or a combination thereof associated at least one client, wherein the at least one query further includes, at least in part, the contextual information, the predicted contextual information, the at least one parameter which identifies the AP, or a combination thereof. By way of example the contextual information may include such information as security information (e.g., related to the "Authentication Process"), information about the client's capabilities (e.g., realm its credentials belong to), the client's approximate location, one or more AP identifiers, etc. More specifically, the current location of the client may be determined from the GPS information associated with the client, cell ID, A-GPS, or a combination thereof. Further, the predicted contextual location may include information such as a range of geo-coordinates where the station is likely to move, the amount of bandwidth an application may likely require, etc. By way of example, by predicting the contextual location of a client ahead of time, pre-authentication can be performed before the client is associated with a particular AP thus expediting the handoff time during the movement of the client.

In step 403, the location client 111 determines at least one request, from at least one client, for network information associated with at least one access point, at least one location, or a combination thereof. By way of example, the at least one client (e.g., a STA) may request the networking information from the server for positioning purposes and/or network selection purposes (e.g., completing the "Authentication and Association Processes" with a particular AP), to avoid congesting the network by placing a GAS query to each AP, to increase handover efficiency, etc.

In step 405, the location client 111 processes and/or facilitates a processing of the at least one request to cause, at least in part, a generation of at least one query for the network information from at least one server, wherein the network information is determined from at least one module of the at least one access point. By way of example, once the server contains the updated information about the APs and their characteristics and modes of operation in a certain location, the client could access the server using a protocol like HTTP HELD. More specifically, the query for network information by the client substitutes for, supplements, or a combination thereof local discovery of the network information from the APs. In response, the server delivers the requested information to the client (e.g., in an HTTP response including the requested data in an XML formatted form). As previously discussed, the client could then use the received network information for positioning and/or network selection.

In step 407, the location client 111 optionally causes, at least in part, a pre-configuration of the network information at the at least one client, wherein the at least one client processes and/or facilitates a processing of the pre-configured network information to support one or more positioning functions, one or more network selection functions, or a combination thereof when in proximity to the at least one access point. As previously discussed, the pre-configuration of the network information enables the client to pre-discover the neighboring networks and then select the best one, which both improves the user experience and reduces the time needed for a handover. Moreover, based on the pre-configuration of the client, the client would not need to do constant passive scanning to find nearby APs, which results in battery savings and a reduction of network congestion (e.g., not making a GAS query to every AP every time a network connection is desired).

Figure 5A:
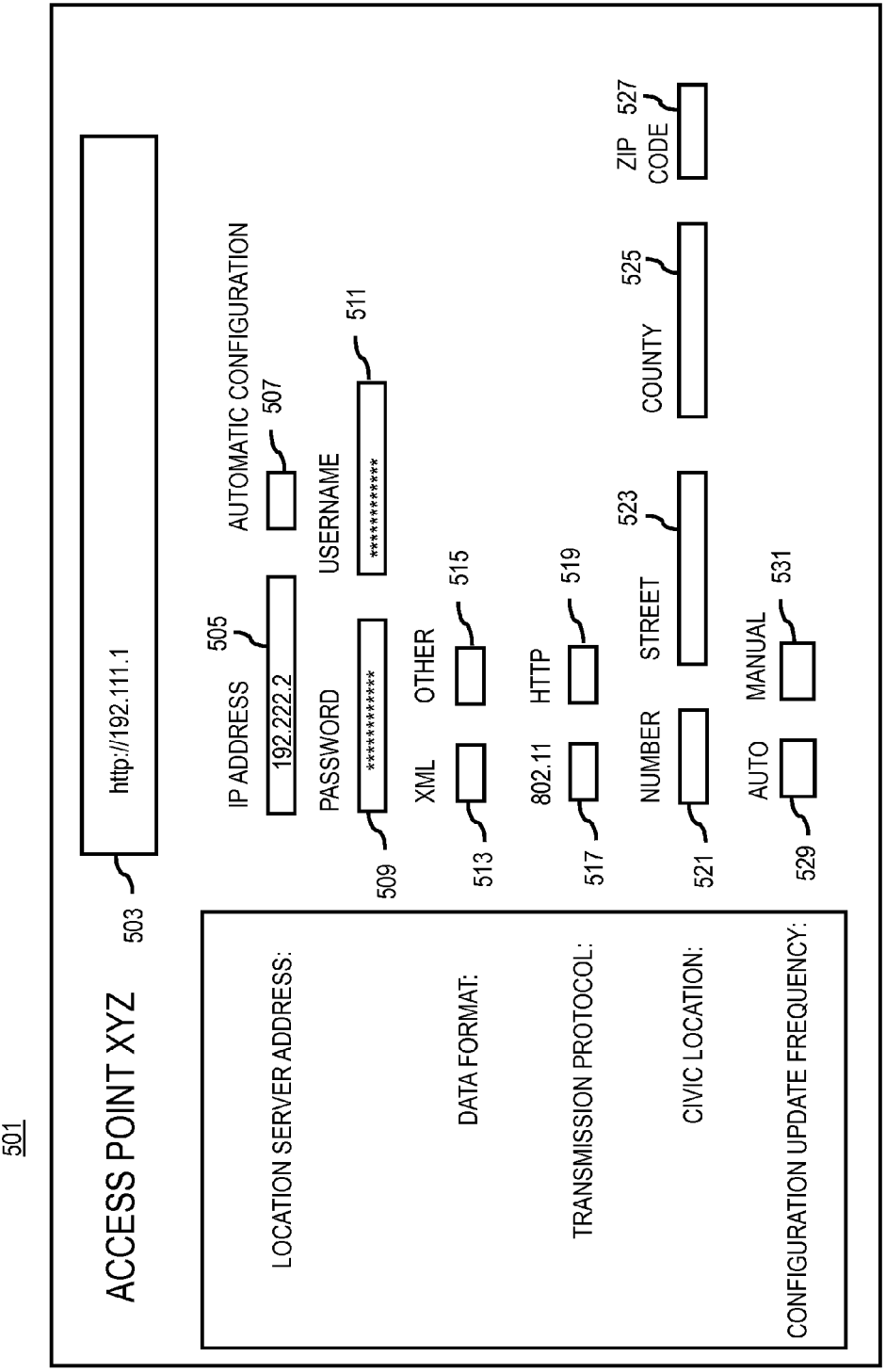
FIGS. 5A and 5B are diagrams of an access point user interface and a client user interface, respectively, utilized in the processes of FIGS. 3 and 4, according to various embodiments.
Figure 5B:
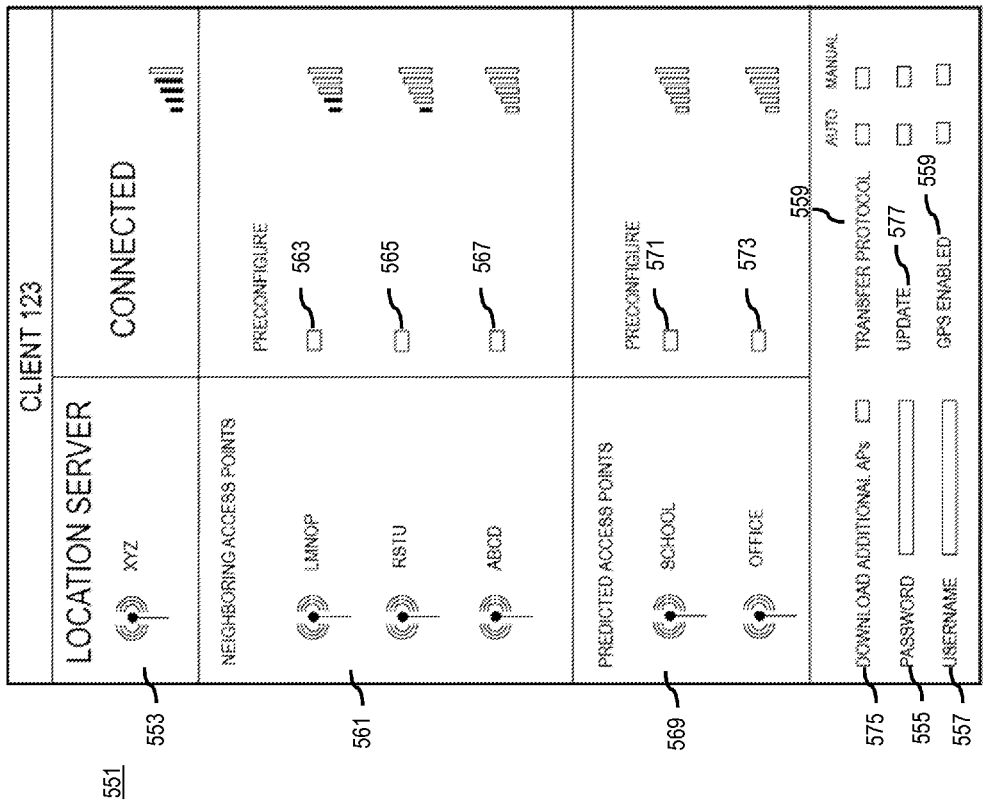

FIGS. 5A and 5B are diagrams of an access point user interface and a client user interface, respectively, utilized in the processes of FIGS. 3 and 4, according to various embodiments. As shown, the example user interface of FIG. 5A includes one or more user interface elements and/or functionalities created and/or modified based, at least in part, on information, data, and/or signals resulting from the processes (e.g., process 300) described with respect to FIG. 3. More specifically, FIG. 5A illustrates a user interface (e.g., user interface 501) depicting various embodiments. As shown in user interface 501, (e.g., a web interface or configuration page), an AP (e.g., AP XYZ) is accessed by an end user by entering the AP's IP address (e.g., 192.111.1) into dialogue box 503 of the user interface 501. Once a connection is established with the AP, which may or may not require entering credentials (e.g., a username and a password), the end user may configure the AP via the user interface 501 and respective dialogue boxes and/or prompts.

In one embodiment, the end user may determine to associate the AP with a particular server (e.g., location platform 103) in order to transmit the network information associated with the particular AP to the server, wherein the network information is then made available by the server to one or more clients (e.g., STAs), one or more candidate clients (e.g., STAs proximate to the AP), or a combination thereof. As previously discussed, in certain embodiments, the AP may transmit the network information to more than one server. In order to establish a connection with a server, the AP must first know the IP address of the server. In one embodiment, the IP address information is preconfigured in the AP (e.g., as shown in dialogue box 505) or the end user may employ one or more server discovery protocols (e.g., DNS or LoST) by selecting dialogue box 507. In certain embodiments, an end user may further be required to enter credentials (e.g., a username and a password) in dialogue boxes 509 and 511, respectively, in order to establish a secure connection between the AP and the server.

In one embodiment, before the network information can be transmitted between the AP and the server, the network information must first be formatted according to one or more data formats common to the AP, the sever, the one or more clients, the one or more candidate clients, or a combination thereof (e.g., placing the collected parameters into a predefined XML document). Accordingly, the end user is provided the ability to determine whether the information will be formatted as an XML format or as some other format by selecting the dialogue boxes 513 and 515, respectively. In addition, the end user must also select the method by which the network information is transported from the AP to the server. By way of example, the end user can determine to use a standardized protocol such as IEEE 802.11 or HTTP, which the end user can determine by selecting dialogue boxes 517 and 519, respectively.

In one embodiment, in addition to configuration data and measurement information (e.g., from neighboring APs), the server needs to know the geographic location of the AP in order to improve positioning and network selection efficiency of the one or more associated clients, the one or more candidate clients, or a combination thereof. In the future, APs may contain a GPS receiver which can transmit the geo-coordinates of the AP directly to the server. However, currently, it is often the responsibility of the end user to enter the location data of the AP in a civic location form (e.g., the number, street or road name, community and county assigned to residential, commercial, institutional, and industrial buildings) using dialogue boxes 521, 523, 525, and 527 respectively. More specifically, the civic location form is used in certain embodiments because most end users are not familiar with and likely do not know the GPS or geo-coordinates of the location of the AP. However, postal services in many countries have the GPS coordinates of the civic locations and therefore the server may later be able to geo-coordinate the AP based on the entered civic location.

In one embodiment, the initiation of the processing of the configuration data, the transmission of the network information, or a combination thereof is based, at least in part, on an update of the configuration data. As previously discussed, the configuration data of the AP may be periodically updated by one or more service providers or by the end user (e.g., changing the security features of the AP, etc.) and the update parameters may be set by the end user using dialogue boxes 529 and 531, respectively.

As shown, the example user interface of FIG. 5B includes one or more user interface elements and/or functionalities created and/or modified based, at least in part, on information, data, and/or signals resulting from the processes (e.g., process 400) described with respect to FIG. 4. More specifically, FIG. 5B illustrates a user interface (e.g., user interface 551) depicting various embodiments. In one embodiment, once the server (e.g., location server or location platform 103) has determined network information about an AP (e.g., XYZ), a client (e.g., 123) could access the server (e.g., location server) user a protocol like HTTP HELD and ask for that information rather than contacting the AP directly as depicted in dialogue box 553. More specifically, the system 100 determines context information (e.g., security information, information about the client's capabilities, the client's approximate location, etc.), predicted context information (e.g., a range of geo-coordinates where the client is likely to move), or a combination thereof. As previously discussed, in one embodiment, access to the server may require the end user to input credentials (e.g., a username and a password), which the end user can do using the dialogue boxes 555 and 557, respectively. In terms of the location of the client, the current location of the client may be determined from GPS information associated with the client, cell ID, A-GPS, or a combination thereof. The dialogue box 559 enables the end user to enable the GPS features of the client in order to increase the accuracy of the location information associated with the client. In one embodiment, the system 100 optionally causes a pre-configuration of the network information at the client based on the contextual information, the predicted contextual information, the at least one parameter which identifies at least one AP, or a combination thereof. By way of example, the pre-configuration of the network information can enable the system 100 to discover neighboring APs ahead of time and thus expedite the handover time during the movement of the client towards or away from an associated AP. More specifically, based on the context information, predicted context information, or a combination there user interface 551 displays the neighboring APs (e.g., within a certain geographic proximity) as depicted in dialogue box 561 and enables the user to pre-configure the client for one or more of these APs (e.g., based on signal strength) using the dialogue boxes 563, 565, and 567, respectively. In addition, based on the schedule and/or common geographic routes associated with the client, the user interface 551 also can display predicted APs as depicted in dialogue box 569 and similarly enables the user to pre-configure the client for one or more of these APs using the dialogue boxes 571 and 573, respectively. Further, the user interface 551 may be used by the end user in order to download additional AP listing depending on the schedule and/or anticipated travel destination of the user by using dialogue box 575. In certain embodiments, depending on the requirements of the system 100, the end user may also configure and/or modify the network information transfer protocol (e.g., HTTP HELD or some other standardized protocol) and/or the update schedule (e.g., firmware) of the client by using dialogue boxes 577 and 579, respectively.

The processes described herein for providing a WiFi network information service may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
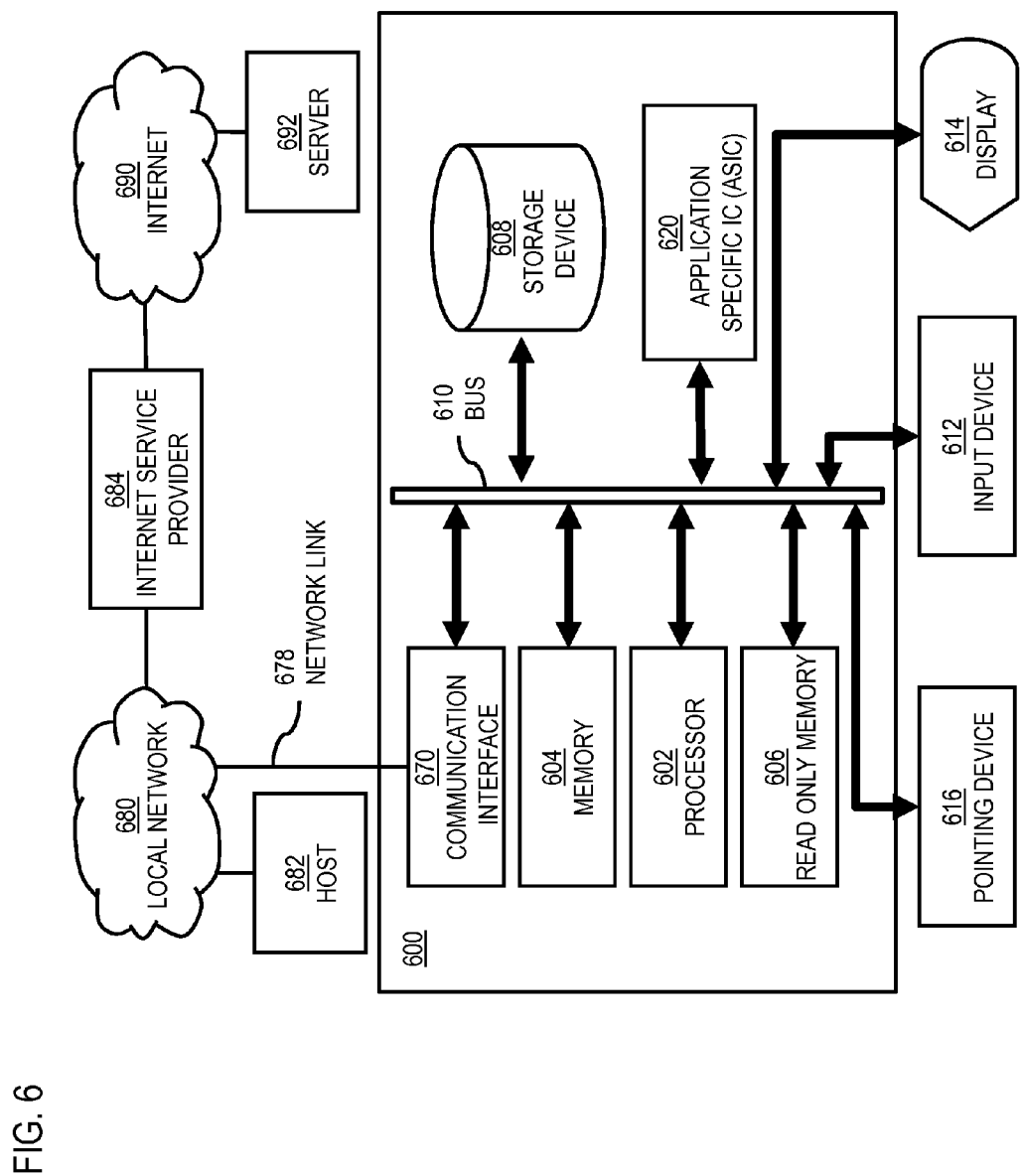
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide a WiFi network information service as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing a WiFi network information service.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to provide a WiFi network information service. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for providing a WiFi network information service. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing a WiFi network information service, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing a WiFi network information service to the UE 109.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to provide a WiFi network information service as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of providing a WiFi network information service.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide a WiFi network information service. The memory 705 also stores the data associated with or generated by the execution of the inventive steps.

Figure 8:
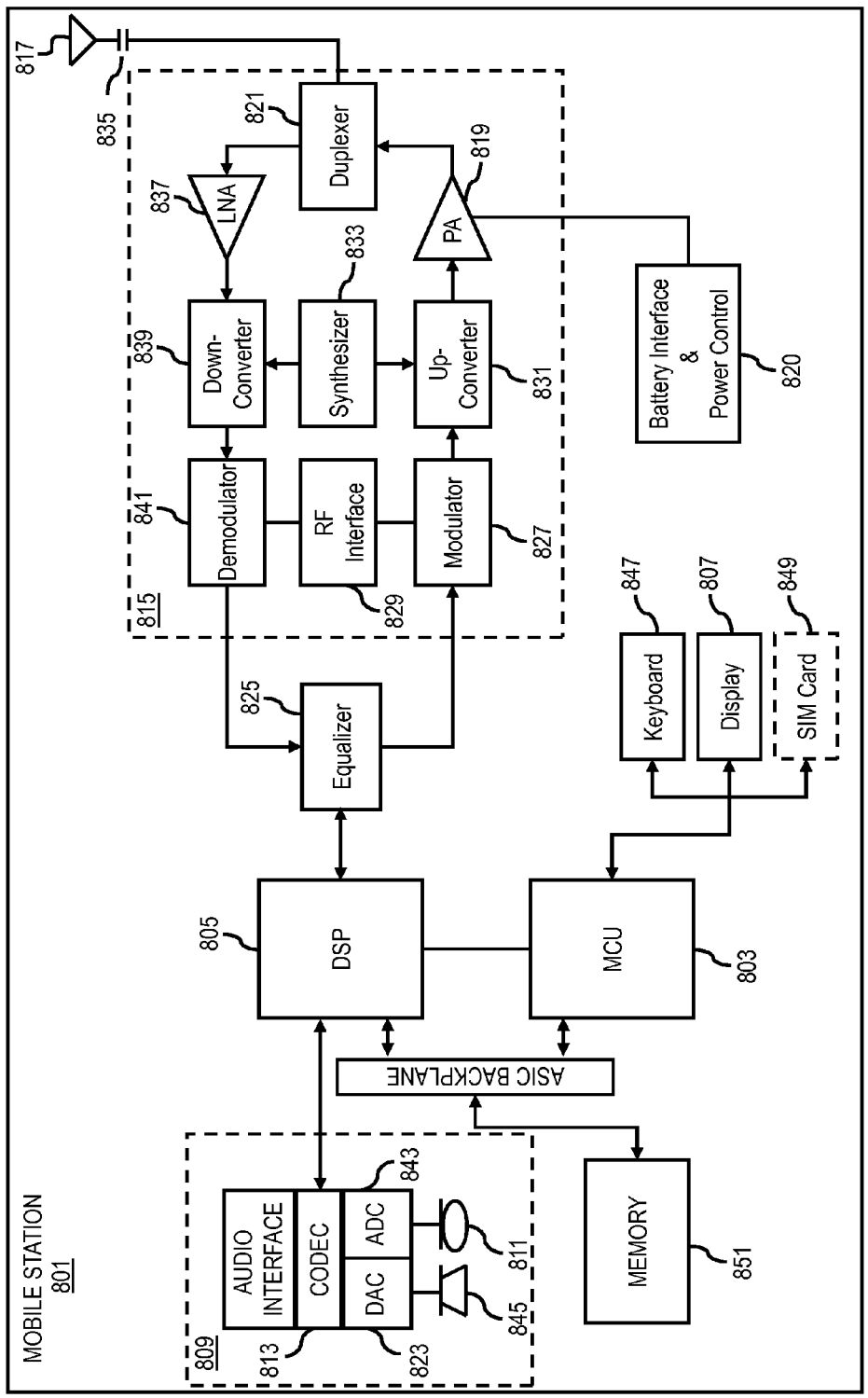
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of providing a WiFi network information service. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing a WiFi network information service. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide a WiFi network information service. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
determining network information of at least one access point connected to a data network, at the at least one access point, from configuration data stored at the at least one access point, wherein the configuration data includes information which the at least one access point is configured to wirelessly communicate with one or more wireless user devices and to support the one or more wireless user devices to access the data network therethrough for one or more information services, and the network information includes a geographic or civic location of the at least one access point; and
transmitting the network information from the at least one access point via the data network to at least one server, wherein the network information is to be delivered from the at least one server via a wireless communication network to the one or more wireless user devices when approaching the at least one access point.

2. A method of claim 1, further comprising:
determining, by the at least one access point, address information of the at least one server for transmitting the network information, wherein the address information is preconfigured at the at least one access point, discovered by the at least one access point using one or more server discovery protocols, or a combination thereof,
wherein the at least one access point is wired to the data network.

3. A method of claim 1, further comprising:
initiating the determination and the transmission of the network information based, at least in part, on an initialization of connecting at least one access point to the wired network, a predetermined schedule, an update to the configuration data, an expiration of the network information, or a combination thereof.

4. A method of claim 1, further comprising:
executing a code at the at least one access point to collect the configuration data from the one or more management information base variables stored within the at least one access point,
wherein the network information is made available by the at least one server to one or more clients residing on the one or more wireless user devices, one or more candidate clients, or a combination thereof of the at least one access point.

5. A method of claim 4, further comprising:
formatting the network information according to one or more data formats common to the at least one access point, the at least one server, the one or more clients, the one or more candidate clients, or a combination thereof.

6. A method of claim 1, further comprising:
receiving, at the at least one access point, measurement information of one or more neighboring access points in proximity of the at least one access point;
including the measurement information in the network information, wherein the measurement information includes information which the one or more neighboring access points are configured with to support the one or more wireless user devices, one or more other wireless user devices, or a combination thereof to connect to the wired network, one or more other networks, or a combination thereof.

7. A method of claim 1, wherein the network information further includes one or more media access control addresses, one or more realms the at least one access point supports, one or more fully qualified domain names, wide area network metric information, one or more firmware versions, or a combination thereof.

8. A method comprising:
predicting, at at least one server, context information of one or more wireless user devices, the context information including one or more predicted locations of the one or more wireless user devices;
when the one or more wireless user devices are predicted as approaching at least one access point connected to a data network, receiving, at the at least one server via the data network from the at least one access point, network information of the at least one access point, wherein the network information includes geographic or civic locations of the one or more access points and the network information is determined by the at least one access point from configuration data stored thereat, and the configuration data includes information which the at least one access point is configured to wirelessly communicate with one or more wireless user devices and to support the one or more wireless user devices to access the data network therethrough for one or more information services; and
transmitting the network information from the at least one server via a wireless communication network to the one or more wireless user devices to support one or more network access point selection functions.

9. A method of claim 8, further comprising:
causing, at least in part, a pre-configuration of network settings of the one or more wireless user devices when approaching the at least one access point,
wherein the network information further includes one or more media access control addresses, one or more realms the at least one access point supports, one or more fully qualified domain names, wide area network metric information, one or more firmware versions, or a combination thereof.

10. A method of claim 8, further comprising:
causing, at least in part, a presentation of a current access point, one or more neighboring access point in proximity of the current access point, the one or more access points in proximity of the one or more predicted locations, or a combination thereof, on a user interface of the one or more wireless user devices, wherein the presentation includes one or more signal strength indications of the current access point, the one or more neighboring access point, the one or more access points in proximity of the one or more predicted locations, or a combination thereof.

11. An apparatus comprising:
at least one processor; and
at least one memory including computer program code for one or more programs,
the at least one memory and the computer program code configured to, with the at least one processor, cause the apparatus to perform at least the following,
determine, at at least one access point connected to a data network, network information of the at least one access point from configuration data stored at the at least one access point, wherein the configuration data includes information which the at least one access point is configured to wirelessly communicate with one or more wireless user devices and to support the one or more wireless user devices to access the data network therethrough for one or more information services, and the network information includes a geographic or civic location of the at least one access point; and
cause, at least in part, a transmission of the network information from the at least one access point via the data network to at least one server, wherein the network information is to be delivered from the at least one server via a wireless communication network to the one or more wireless user devices when approaching the at least one access point.

12. An apparatus of claim 11, wherein the apparatus is further caused to:
determine address information of the at least one server for transmitting the network information, wherein the address information is preconfigured at the at least one access point, discovered by the at least one access point using one or more server discovery protocols, or a combination thereof.

13. An apparatus of claim 11, wherein the apparatus is further caused to:
initiate the determination and the transmission of the network information based, at least in part, on an initialization of connecting at least one access point to the wired network, a predetermined schedule, an update to the configuration data, an expiration of the network information, or a combination thereof.

14. An apparatus of claim 11, wherein the apparatus is further caused to:
execute a code at the at least one access point to collect the configuration data from the one or more management information base variables stored within the at least one access point,
wherein the network information is made available by the at least one server to one or more clients residing on the one or more wireless user devices, one or more candidate clients, or a combination thereof of the at least one access point.

15. An apparatus of claim 14, wherein the apparatus is further caused to:
format the network information according to one or more data formats common to the at least one access point, the at least one server, the one or more clients, the one or more candidate clients, or a combination thereof.

16. An apparatus of claim 11, wherein the apparatus is further caused to:
receive measurement information of one or more neighboring access points in proximity of the at least one access point;
including the measurement information in the network information, wherein the measurement information includes information which the one or more neighboring access points are configured with to support the one or more wireless user devices, one or more other wireless user devices, or a combination thereof to connect to the wired network, one or more other networks, or a combination thereof.

17. An apparatus of claim 11, wherein the network information further includes one or more media access control addresses, one or more realms the at least one access point supports, one or more fully qualified domain names, wide area network metric information, one or more firmware versions, or a combination thereof.

18. An apparatus comprising:
at least one processor; and
at least one memory including computer program code for one or more programs,
the at least one memory and the computer program code configured to, with the at least one processor, cause the apparatus to perform at least the following,
predict, at at least one server, context information of one or more wireless user devices, the context information including one or more predicted locations of the one or more wireless user devices;
when the one or more wireless user devices are predicted as approaching at least one access point connected to a data network, receiving, at the at least one server via the data network from the at least one access point, network information of the at least one access point, wherein the network information includes geographic or civic locations of the one or more access points and the network information is determined by the at least one access point from configuration data stored thereat, and the configuration data includes information which the at least one access point is configured to wirelessly communicate with one or more wireless user devices and to support the one or more wireless user devices to access the data network therethrough for one or more information services; and
transmit the network information from the at least one server via a wireless communication network to the one or more wireless user devices to support one or more network access point selection functions.

19. An apparatus of claim 18, wherein the apparatus is further caused to:
cause, at least in part, a pre-configuration of network settings of the one or more wireless user devices when approaching the at least one access point,
wherein the network information further includes one or more media access control addresses, one or more realms the at least one access point supports, one or more fully qualified domain names, wide area network metric information, one or more firmware versions, or a combination thereof.

20. An apparatus of claim 18, wherein the apparatus is further caused to:
cause, at least in part, a presentation of a current access point, one or more neighboring access point in proximity of the current access point, the one or more access points in proximity of the one or more predicted locations, or a combination thereof, on a user interface of the one or more wireless user devices, wherein the presentation includes one or more signal strength indications of the current access point, the one or more neighboring access point, the one or more access points in proximity of the one or more predicted locations, or a combination thereof.

\* \* \* \* \*